United States Patent [19]

Callan

[11] 4,065,034

[45] Dec. 27, 1977

[54] GUN-TYPE DISPENSER FOR HEAT SOFTENABLE ADHESIVE OR SEALANT COMPOUNDS

[75] Inventor: John E. Callan, Broken Arrow, Okla.

[73] Assignee: Cities Service Company, Tulsa, Okla.

[21] Appl. No.: 710,068

[22] Filed: July 30, 1976

[51] Int. Cl.² ............................................. B67D 5/62
[52] U.S. Cl. .............................. 222/146 HE; 222/391
[58] Field of Search ................ 222/146 HE, 391, 327, 222/146 H

[56] References Cited

U.S. PATENT DOCUMENTS

| 2,561,825 | 7/1951 | Sherbondy | 222/391 X |
| 3,612,357 | 10/1971 | Ruskin | 222/146 HE |
| 3,951,308 | 4/1976 | Thirtle | 222/146 HE |

Primary Examiner—Stanley H. Tollberg
Attorney, Agent, or Firm—Richard S. Strickler; Elton F. Gunn

[57] ABSTRACT

A simple, inexpensive gun-type dispenser is disclosed whereby purchased cartridges of heat softenable adhesive or sealant compound can be heated and dispensed during non-commercial projects such as crack sealing or gluing of components by a home handyman. The dispenser comprises a barrel having a breech with an axially aligned opening therein for the loading of cartridges of the compound to be dispensed, a breech access for uncovering the breech opening and for closure thereof after the insertion of a cartridge, electrical heating elements for heating the outer end of the barrel, and a mechanical feeder for urging the compound into the heated end of the barrel.

1 Claim, 3 Drawing Figures

GUN-TYPE DISPENSER FOR HEAT SOFTENABLE ADHESIVE OR SEALANT COMPOUNDS

BACKGROUND OF THE INVENTION

This invention pertains to hand-held applicators or dispensers for applying heat softenable or meltable compounds such as sealants or adhesive to a receiving surface, and more particularly pertains to improvements whereby means are provided for electrically heating the outer end of the barrel of the device, and for mechanically driving the compound being applied into the heated portion of the barrel for softening and extrusion of the compound from a nozzle.

Hand-held, electrically heated dispensers for softening and applying hot melt adhesives are known in the art, and are disclosed, for instance, in U.S. Pat. Nos. 3,764,045; 3,877,610; 3,951,307. The design of such dispensers is complex, so that construction thereof is time consuming and costly, and they require a compressed air supply for the pneumatic means that is used for expelling the melted adhesive compound when applying it to an adhesive-receiving surface. Such dispensers have, therefore, been intended for purchase and use primarily by industry and commercial contractors, and are too expensive to purchase or impractical for use by an occasional user such as a home handyman.

SUMMARY OF THE INVENTION

It is therefore an object of the present invention to provide a gun-type dispenser, for application of a heat softenable adhesive or sealant during gluing or sealing operations, which is simple in design and easy to build.

A primary object is to provide a gun-type dispenser that is inexpensive to purchase and maintain, and which is relatively trouble-free in operation and highly effective for applying heated adhesive or sealant compounds.

Another object is to provide a gun-type dispenser for applying heat softenable adhesives or sealants that has thermostatically controlled heating means at the outer end of the barrel which maintains the compound therein at a selected temperature, and whereby the input of heat to the compound is increased during the feeding thereof into the heated end of the barrel.

Still another object is to provide a gun-type dispenser for adhesive or sealant compounds which has a mechanical, hand-operated drive means for pushing the compound into the heated outer end of the barrel, thereby obviating the need for a complicated pneumatic drive means and the compressed air source required for its operation.

Other objects and advantages of the present invention will become apparent from the following description, the drawings, and the appended claims.

The present invention is, therefore, a gun-type dispenser, for applying hot melt or heat softenable adhesive or sealants, which comprises a barrel having a breech at the inner end and a discharge orifice at the outer end, the breech having an opening therein for the loading of cartridges of an adhesive or sealant compound, the openings being oriented axially with respect to the barrel. Electric heating means is located at the outer end of the barrel for softening the compound so that it can be extruded from the discharge orifice. Breech access means is used for uncovering the opening therein for insertion of a cartridge into the breech, and for closure of the opening following insertion of the cartridge. Hand operated mechanical feeding means is located at the inner end of the barrel for urging an inserted cartridge of the compound toward the heated outer end.

Advantageously, the cartridge loading means comprises a plunger carrier means that is pivotally connected with the barrel whereby the plunger swings outwardly therefrom for uncovering the opening in the breech, and which swings inwardly for closure of the opening following insertion of a cartridge of the compound into the breech.

BRIEF DESCRIPTION OF THE DRAWINGS

FIG. 3. is a circuit diagram of the barrel heating means used with the dispenser shown in FIGS. 1 and 2.

DESCRIPTION OF PREFERRED AND ALTERNATIVE EMBODIMENTS

Figure 2:
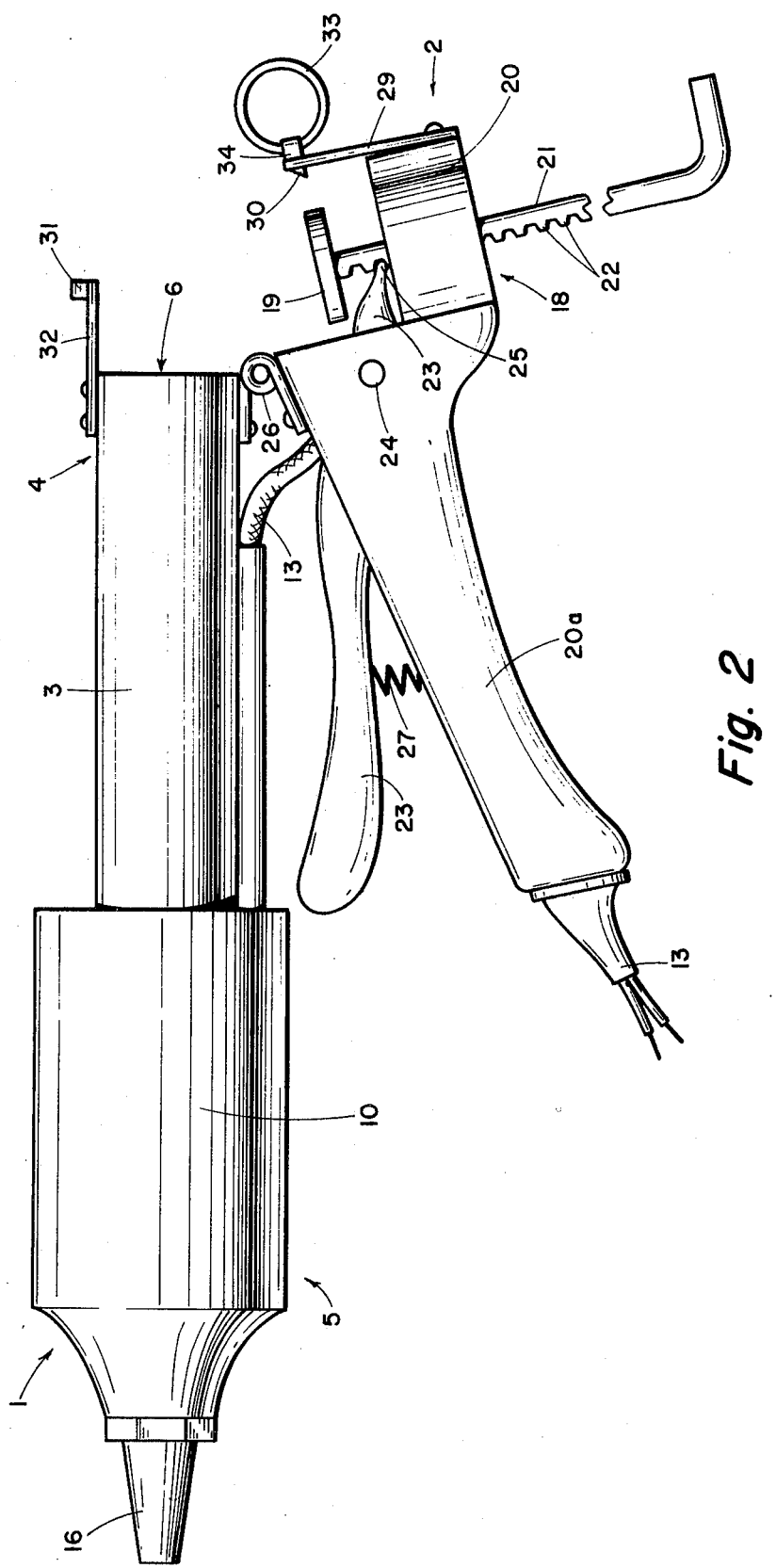
FIG. 2. is a side view of the sealant dispenser shown in FIG. 1, and shows the dispenser with the breech opened for insertion of a cartridge of heat softenable adhesive or sealant compound.

In the drawings, the gun-type dispenser has front and rear ends which are generally represented at 1 and 2, respectively. The hollow, cylindrical barrel 3 of the gun has an inner end 4 and an outer end 5, the inner end being a breech having an opening 6 (FIG. 2) that is coaxially aligned with the barrel and through which a cartridge of sealant compound is loaded into the breech when it has been opened as shown in FIG. 2. The cartridge comprises an outer tubular shell 7 of wrapped paper or a polymeric material such as polyethylene or polypropylene, a charge 8 of solid or semi-solid adhesive or sealant compound having a relatively low softening point, and a wadding 9 made of stamped metal or molded plastic which conforms to the inner circumferential wall of the shell 7 and is slidable therein for pushing the compound out of the shell when it becomes sufficiently softened by heating.

The outer end 5 of the barrel is equipped with a contiguous, annular, heat conductive jacket 10 which contains heating elements 11 and 12. Electric power is supplied intermittently to the elements during operation by means of power leads 13 and thermostatic switches 14 and 15, respectively. The outer end 5 of the barrel is thus heated in a controlled manner for maintaining compound 8a within a selected temperature range. The outer end of the jacket is provided with a nozzle 16 having an orifice 17 therein for extrusion of the heated compound from the barrel so that it can be supplied to a receiving surface during a gluing or sealing operation. Accordingly, the compound 8a is maintained within a temperature range whereby the compound is softened to a degree which permits unimpaired extrusion thereof out of the nozzle by axial pressure on wadding 9 from the inner end 4 of the barrel and which assures that the compound has desired flow and adhesive characteristics following the extrusion.

A hand operated mechanical feeding means, generally indicated at 18, is located at the inner end 4 of the barrel for urging the compound slug 8 of an inserted cartridge into the outer, heated end 3 of the barrel. As shown in the drawings, the breech access means comprises a plunger 19 having a carrier means 20 that is pivotally connected with the barrel whereby the plunger swings outwardly from the barrel (FIG. 2) for uncovering the opening 6 in the breech, and swings inwardly for closure of the opening (FIG. 1) following insertion of a cartridge therein. In addition to being pivotable, the plunger is also sized for insertion into the barrel 3 and shell 7 of the cartridge when pivoted for closure of end opening 6, and is thrustable axially in the barrel toward the outer end 5 thereof with the drive means 18 whereby the compound slug 8 is pushed into the heated outer end 5 of the barrel for extrusion of a softened portion 8a of the compound out of the discharge orifice 17.

For thrusting the plunger axially in the barrel 3 in order to extrude softened compound out of the dispenser, the plunger can include a toothed portion, such as plunger rod 21, which extends rearwardly in axial alignment with said barrel when the plunger 19 is pivoted for closure of breech opening 6, and which has a set of longitudinally aligned teeth 22 thereon. A hand operated tooth driving element 23 engages the teeth 22 of rod 21, and the plunger is advanced toward the outer end 5 of the barrel when the driving element is operated. To advantage, the plunger carrier means 20 can comprise a handle 20a, and the driving element 23 can be pivotally connected at 24 to the handle. It will be understood that the plunger 19 can, where preferred, be an elongated cylinder having teeth such as 22 thereon whereby the need for a distinct rod portion 21 is obviated.

To further advantage, the driving element 23 can comprise a pawl 25 which engages teeth 22, and with said teeth being ratchet teeth. When such an arrangement is used, pivotal connection of the plunger carrier means with the barrel can be accomplished by means of a hinge 26 attached to the inner end 4 of the barrel and handle 20a of the plunger carrier means. Depression of the driving element with the same hand used for simultaneously gripping handle 20a causes rod 21 to be advanced axially by transfer of force from the pawl to the rod. Driving element 23 thereafter returns to an outward position as shown by pressure exerted thereon with a compressed helical spring 27, the ends of which rest against spring rests (not shown) on the driving element and the handle. Accordingly, the pawl 25 is returned rearwardly for engagement with a more rearward tooth so that the rod 21 can again be advanced axially when the driving element 23 is depressed.

The rear end 2 of the gun is equipped with latching means 28 whereby the plunger carrier means 18 becomes locked in position when pivoted for closure of the breech opening 6, and can be unlatched by hand for pivoting outwardly for uncovering the breech opening when loading a cartridge. The illustrated latching means is located on the plunger carrier means 18 and comprises a resilient latch arm 29 having a latch hook 30 thereon for engagement with a barrel 3 by means of a strut 32 which extends rearwardly beneath the latch arm. Ring 33 is attached to the latch arm 29 by means of a swivel 34 and provides means for flexing the latch arm outwards by hand for unlatching so that the breech opening 6 can be uncovered when another cartridge is to be loaded. Other latching means can be used for locking and unlocking the carrier means, e.g. sliding or pivoting latch arms that are attached to the barrel or the plunger carrier means can be used, or the latch arm 29 can be attached to the barrel and the latch receiver 31 can be attached to the plunger carrier means.

In other alternative embodiments of the present invention, hand operated driving means other than a ratchet and pawl arrangement can be used. The operating element 23 can, for instance, be used for rotation of compounded gears, one of which engages the longitudinal teeth on the plunger rod 21, or the rod and the carrier 20 can be threaded for driving the plunger 19 axially within the barrel by rotation of the rod on its longitudinal axis, and in which case driving element 23 is obviated. It will also be understood that the plunger carrier 20 can be pivotally connected to barrel 3 so that it can be swung inwardly and outwardly of the barrel in any preferred direction other than downwardly as shown in the drawings. The plunger carrier means 20 can, for instance, be pivotable in a sideways direction or upwardly.

In FIG. 3, one of the power leads 13 serves as a common ground for the heating elements 11 and 12, being connected therewith at terminal 13b. The other power lead supplies power to each of the elements through their respective thermostatic switches 14 and 15 while using a parallel wiring circuit as shown. Both thermostatic switches are of the normally closed variety so that when power is first supplied by lines 13, it will travel through both switches 14 and 15 and both elements 11 and 12 for rapid heating of the outer end 5 of the barrel. Switch 14, located inwardly on the barrel from switch 15, is set to open at a slightly lower temperature than is switch 15, so that when sealant compound is not being extruded from the nozzle 17, only the element 12 is turned on and off by switch 15 for keeping the compound 8a in a softened condition. When, however, the unsoftened sealant is driven into the outer end of the barrel 5, the wall section of the tube adjacent switch 14 is thereby cooled and switch 14 then closes to supply electric current to element 11, whereby the element 11 serves as a booster heater for rapid softening of the compound during the feeding and application thereof by means of the dispenser.

Figure 1:
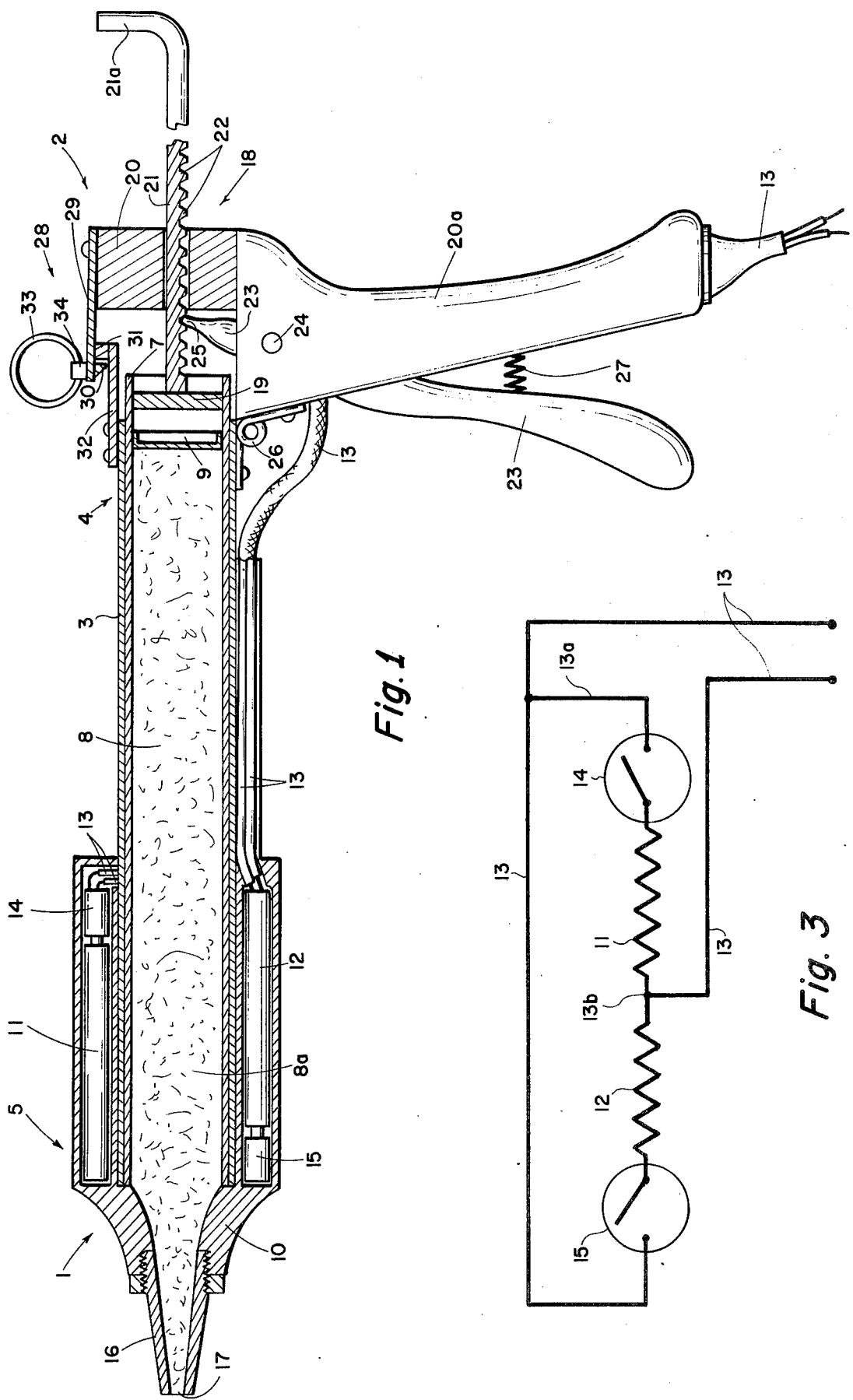
FIG. 1. is a side view, mostly in section, of a sealant dispenser constructed in accordance with the present invention, and shows the dispenser in an operating mode.

In FIG. 1, the cartridge of sealant compound comprises a rigid outer shell 7 of paper which is lined with a lubricant and/or anti-sticking agent such as wax, a silicone, or a synthetic polymer such as polyethylene or polypropylene. The shell 7 extends outward from the inner end 4 of the barrel to facilitate its removal from the barrel when all of the compound has been expelled therefrom. Alternatively, the cartridges can comprise an outer shell of a solidified polymer such as polyethylene or polypropylene which melts or softens along with compound 8a in the heated end of the barrel, so that it becomes mixed with the softened compound as it melts and can thus be extruded from the dispenser along with it. Any suitable polymer that is compatible with the particular compound being applied can be used as an outer covering for the cartridges. Accordingly, the inner bore of the barrel 3 can be entirely metallic, i.e. it is not necessary that any portion of the bore be lined with a lubricating, high temperature polymer such as polytetrafluoroethylene, e.g. Teflon.

The dispenser shown in the drawings can, of course, be provided with an additional handle located toward the outer end of the barrel for gripping and guiding the assembly during application of an adhesive or sealant compound. It will also be appreciated that all or part of the barrel 3 can be insulated to conserve heat and to protect an operator of the device from discomfort or burns. Preferably, the barrel 3 is made of cold drawn steel tubing, whereas the heating jacket 10 at the outer end of the barrel can be made of an aluminum or magnesium alloy. The plunger carrier means, including handle 20a thereof, can be made of stamped or cast metal, or can be molded from plastics or resins having a high impact strength and good head resistance, e.g. ABS or phenolic resins. Conveniently, the power cord comprising leads 13 can pass through handle 20a as shown, but can lead directly into the heating jack 10 when such is preferred.

It should be noted that the present dispenser for heat softened adhesives or sealants comprises an opening 6 in the end of the barrel 3 which is oriented axially with the barrel for loading of cartridges, as opposed to a longitudinally extending opening in the side of the barrel as has been employed for loading cartridges in prior dispensers. The axially oriented end opening of the present dispenser provides the advantage of being able to use cartridges of compound enclosed within a shell having a low burst strength, e.g. polymeric shells, without danger of rupture of the cartridge as to imperil the operator or objects in the neighborhood of the dispensing operation.

A gun-type dispenser which fulfills the previously stated objects has now been described, and it will be understood that even though the invention has been described with reference to specific embodiments thereof, other embodiments will become apparent which are within the spirit and scope of the invention defined in the following claims.

What is claimed is:

1. A gun-type dispenser for applying a heat softenable adhesive or sealant compound to a receiving surface therefor, comprising:

a. a barrel having a breech at the inner end and a discharge orifice at the outer end, said breech having an opening therein for the loading of cartridges that is oriented axially with respect to said barrel, b. electric heating means for heating said outer end of the barrel, c. breech access means for uncovering said opening in the breech for insertion of a cartridge of said compound into the breech and for closure of said opening following insertion of a cartridge therein, said breech access means comprising a plunger having a plunger carrier means that is pivotally connected to said barrel whereby said plunger swings outwardly from said barrel for uncovering said opening in the breech, and swings inwardly for closure of the opening following insertion of a cartridge of said compound, said plunger including a toothed portion which extends rearwardly of said barrel, said toothed portion having a set of longitudinally aligned teeth, and further comprising a hand operated, toothed driving element which engages the teeth of said plunger, and wherein said plunger is advanced toward said outer end of the barrel when said driving element is operated, said carrier means for said plunger including a handle, and said driving element being pivotally connected to the handle and hand operable upon gripping said handle, said driving element comprising a pawl and said teeth on the plunger being ratchet teeth, and d. mechanical feeding means at the inner end of the barrel for urging the compound of an inserted cartridge into said outer end of the barrel, said feeding means being hand operated.

* * * * *